United States Patent Office 3,076,748

Patented Feb. 5, 1963

3,076,748
POLIOMYELITIS VIRUS ATTENUATION WITH ULTRAVIOLET LIGHT AND BETA PROPIOLACTONE

Gerald A. Lo Grippo, Pleasant Ridge, Eugene A. Timm, Grosse Pointe Woods, and Alton R. Taylor, Grosse Pointe Park, Mich., assignors to Henry Ford Hospital and Parke, Davis & Company, both of Detroit, Mich., both corporations of Michigan No Drawing. Filed Apr. 3, 1957, Ser. No. 650,298

5 Claims. (Cl. 167—78)

This invention relates to poliomyelitis vaccines and to a method for preparing the same from live poliomyelitis virus.

In accordance with the invention an aqueous fluid containing living poliomyelitis virus is subjected to the action of both ultraviolet irradiation and beta-propiolactone wherein the action of one of these agents is sufficient to kill a major proportion of the living poliomyelitis virus present in the fluid and the action of the other of these agents is sufficient to kill all of the residual living poliomyelitis virus present in the fluid, neither agent to the extent employed being alone capable of completely killing all of the living poliomyelitis virus originally present in the fluid. The order in which the two agents are employed is not critical. That is, the virus can be subjected first to the action of ultraviolet irradiation and then to the action of beta-propiolactone; the reverse order of treatment is likewise satisfactory. Also the two treatments can be carried out simultaneously.

The vaccine product obtained by this method not only is free from living poliomyelitis virus but also possesses a higher degree of antigenicity than a vaccine prepared by the known method of inactivation with formaldehyde. It has the added advantage, in contrast to formaldehyde-killed vaccine, that the killed poliomyelitis virus present in the vaccine shows no tendency to re-activate upon storage. The vaccine has a further advantage in that the chemical agent used for its production, unlike other chemical agents such as formaldehyde, is self-destroying on storage, being readily decomposed into innocuous by-products.

The invention is applicable to the different types of poliomyelitis virus, i.e., Types 1, 2 and 3. In practicing the invention, mixtures of these types can be employed as starting material, but in general, each virus type is treated separately and the resulting vaccine combined later with the vaccine or vaccines prepared from the other type or types.

The aqueous fluid containing the living poliomyelitis virus which is used as the starting material of the process can be conveniently obtained from a tissue culture medium in which poliomyelitis virus has grown or has been propagated. The fluid can be isolated by any suitable means such as filtration, decantation, centrifugation, etc. Conveniently one may employ a tissue-culture filtrate from a medium known as "199" tissue culture medium infected with poliomyelitis virus. One example of such a tissue culture fluid is that obtained by filtration of a monkey kidney tissue culture of poliomyelitis virus prepared as described by Dulbecco et al. in the Journal of Experimental Medicine, volume 99, page 167 (1954). In accordance with this method, macerated monkey kidney tissues are trypsinized to remove extraneous tissue, the residual cells allowed to multiply, the media inoculated with poliomyelitis virus, the mixture incubated, and the fluid harvested. While this method is preferred, the trypsinization step can be omitted, if desired. In this latter instance, however, the protein content of the vaccine may be excessively high and should be assayed before use in order to avoid the production of vaccines which may produce protein reactions. In the preparation of mixed vaccines, that is, vaccines containing more than one type of poliomyelitis virus, it is permissible to pool or mix the harvested fluids containing the various types prior to carrying out the process of the invention but, as indicated above, it is generally preferable to pool or mix the individual vaccines after carrying out the process. For practical purposes, in the interest of employing a virus starting material possessing high antigenicity the infectivity titer of the aqueous fluid should be of high order, that is, at least $10^{-5}$. Generally speaking, a fluid having an infectivity titer in the range of $10^{-5}$ or higher is employed. Under normal conditions of storage, the aqueous fluid is kept under refrigeration, for example, at a temperature in the range of −5° to 10° C. When handled further, in accordance with the invention, the fluid becomes warmer, depending on the temperature conditions employed during processing. The aqueous fluid containing the living poliomyelitis virus is, in general, produced under aseptic conditions and is bacteriologically sterile. However, in general practice bacterial sterility is insured by subjecting the medium to a bacterial filtration prior to use in the process. Additionally one may concentrate and/or partially purify the living virus and employ such solutions as starting materials for the process. For convenience, such solutions will be understood to be included in the expression "aqueous fluids containing living poliomyelitis virus" as used herein.

As indicated hereinbefore the invention is carried out by subjecting the virus fluid to the action of ultraviolet irradiation and of beta-propiolactone. The ultraviolet irradiation phase of the process is carried out by exposing a thin film or stream of the aqueous fluid containing live poliomyelitis virus to ultraviolet light ranging in wavelength between 2000 and 3000 angstrom units and having an intensity sufficiently high to reduce the infectivity titer to an extremely low value in a short period of time, or when used in accordance with the invention with fluid already exposed to beta-propiolactone, sufficiently high to reduce the infectivity titer to zero in a short period of time. In order to insure the desired results, the average thickness of the film or stream which is exposed should in general be not greater than 100 microns and preferably 50 microns or less. A thickness somewhat greater than 100 microns can be employed but in this case greater exposures are required and the resulting loss of antigenicity is correspondingly greater. The source of ultraviolet light employed should emit a high proportion, preferably as high as 95%, of energy at a wave-length of 2537 angstrom units. Light sources emitting a somewhat lower proportion of energy at this desired wavelength are satisfactory but less efficient. For best results, a uniform light source emitting 95% energy at a wavelength of 2537 angstrom units and having a total power output of 10 to 25 watts is employed. The light source is conveniently employed at a distance of about one centimeter from the surface of the aqueous medium to be exposed. In terms of intensity of irradiation for ordinary requirements, the light source should be such as to provide from about 12,500 to 32,000 micro-watts per square centimeter of film surface area under exposure. When using an aqueous virus fluid having an infectivity titer in the range of $10^{-5}$ to $10^{-8}$ as a starting material and the irradiation conditions indicated, an extremely high proportion of live organisms is killed within a matter of a few seconds of exposure. The length of exposure can be varied considerably but in general it is desirable to minimize the length of exposure in order to avoid any undue destruction of the inherent antigenicity of the virus. The preferred period of exposure is less than 10 seconds and for best results, about 0.5 to 2 seconds. For example, when employing ultraviolet light at a wave-length of 2537 angstrom units having an intensity of about 25,000 micro-watts per square centimeter, exposure of the live virus fluid in a film having an average thickness of 50 microns for one second reduces the infectivity titer from $10^{-7}$ to about $10^{-1}$. In general, the conditions of exposure should be such as to reduce the infectivity titer to a value in the range of from $10^{-0.5}$ to $10^{-2.5}$. An apparatus which is preferred for the practice of the invention is a centrifugal filmer of the type described in United States Patent No. 2,725,482. This apparatus is made up of several parts; a slightly tapered, rotatable tube or cylindrical cup about 40 cm. in length with a 1° outward slope from the bottom closed end and a 9.5 cm. top inside diameter; means for rapidly rotating the cup; an influent tube suspended in the center of, and having its opening near the bottom of the cup; six ultraviolet tubular lamps of approximately 30 cm. effective length suspended in the cup surrounding the influent tube and so arranged that their external surface is within about 1 cm. from the internal wall of the cup; and a suitable vessel surrounding the top of the cup to catch and drain off the fluid which is forced out of the top as the cup rotates rapidly during operation of the apparatus. In operation the fluid to be irradiated is introduced through the influent tube onto the bottom of the rapidly rotating cup and is forced outward and upward in the form of a film past the ultraviolet lamps. The film of liquid is continuously pushed upward by the introduction of more material through the influent tube until it finally spills out into the vessel surrounding the top of the cup and is collected. Another apparatus which is suitable is described in United States Patent No. 2,588,716. It is understood that any comparable means for exposing thin films or streams to ultraviolet light for short periods of time will be suitable for the practice of the invention.

The temperature of the aqueous fluid during irradiation is not critical. Unless external heat is applied, the fluid will ordinarily be at room temperature or lower. However, satisfactory results are obtained when the irradiation is carried out on aqueous fluids having a higher temperature such as 37–40° C.

In the phase of the process employing beta-propiolactone the amount thereof to be used should be less than that required to completely kill all of the living poliomyelitis virus present in the untreated aqueous fluid. For this purpose, when employing aqueous virus fluids having a titer in the range of those normally used in the production of poliomyelitis vaccines, the amount of beta-propiolactone is ordinarily in the range from 0.0002 to 0.0010 gram, and preferably in the range from 0.0004 to 0.0006 gram, per milliliter of virus fluid. In cases where beta-propiolactone is employed in greater quantity, the excess remaining after inactivation of the virus can be readily decomposed by heating. So far as it has been possible to ascertain, each of the types of poliomyelitis virus requires the use of about the same concentrations of beta-propiolactone. Due to the acid- and alkali-sensitivity of the protein present in the aqueous fluid used as a starting material, the process is preferably carried out at a pH between 5 and 9 and for best results, in the range from 7.5 to 8.5. The temperature at which this phase of the process is carried out is not critical and can be varied widely. At relatively low temperature the rate of inactivation is slow; for example, at 4° C. twenty-four to seventy-two hours are required for inactivation. It is, therefore, preferable to carry out this phase of the process at room temperature or higher. The optimum temperature is about 37° C. and although this phase of the process can be carried out at higher temperature there is a tendency at such higher temperature toward undesirable loss in the antigenicity of the final product. Accordingly, it is desirable to operate in the range of 20 to 40° C. The reaction which takes place as a result of treatment with beta-propiolactone is both irreversible and rapid. The virus product is "fixed" with respect to killing, that is, the virus does not come back to life upon storage, dilution or further treatment. Killing of the virus is ordinarily complete within two hours or less at a temperature of 37° C. It is important that the beta-propiolactone employed be fresh. Beta-propiolactone which has not been stored under refrigeration or which has been allowed to come in contact with moisture should not be used. Commercially obtainable beta-propiolactone in purified form is satisfactory.

The foregoing description has for simplicity been limited to the treatment of aqueous fluids containing fully virile poliomyelitis virus. It should be understood, however, that the foregoing description applies with equal force to fluids which have already been subjected to partial inactivation or killing.

In carrying out the process it has been found that the most consistent results are obtained if the original aqueous fluid containing the live poliomyelitis virus is subjected either to a bacterial filtration such as Seitz filtration or ultrafine sintered glass filtration, before irradiation or treatment with beta-propiolactone.

If desired, germicidal and/or stabilizing agents can be incorporated in the vaccine products of the invention. For example, benzethonium chloride may be added to the vaccine products to a concentration of about 1:20,000 to 1:50,000; preferably 1:40,000.

The vaccine products of the invention contain no living poliomyelitis virus. They are also sterile in all other respects, that is, they contain no living bacteria, yeasts or molds. The products are capable of producing, upon administration of mammals susceptible to infection with live poliomyelitis virus, an immunity in the mammal against infection by the corresponding live virus. The term "administration" as used herein and in the appended claims means subcutaneous, intradermal or intramuscular injection. The vaccine products can be used either for the production of other poliomyelitis virus vaccine products such as alum or aluminum phosphate precipitated virus vaccine products or they can be administered to mammals for the purpose of inducing immunity. The porducts can, if desired, be administered without dilution but if potency is above standard test requirements it is permissible to dilute them with a reasonable amount of a suitable sterile aqueous medium. Some examples of suitable diluents are sterile Hank's solution, sterile saline and sterile distilled water.

The invention is illustrated by the following examples.

EXAMPLE 1

Cells for the cultivation of poliomyelitis virus are prepared by the method of Dulbecco, Journal of Experimental Medicine, 99, page 167 (1954). Briefly, this procedure consists in first preparing a suspension of monkey kidney epithelial cells (see Dulbecco, Proc. Nat. Acad. Sci., 38, page 747 [1952]), by treating a macerated monkey kidney tissue from healthy cynomolgus or rhesus monkeys with trypsin to remove extraneous matter and release the individual cells. These cells are allowed to multiply on a suitable glass surface in any of a number of tissue culture mediums such as "199" medium. The sheet of cultivated kidney cells thus produced is then inoculated with a seed culture of Type 1 (Mahoney strain) poliomyelitis virus and the mixture incubated at 36–37° C. until destruction of the cells is complete and large amounts of new virus have been released. The fluid containing the virus is harvested and passed through an ultrafine fritted glass candle. The filtrate containing the living Type 1 poliomyelitis virus is assayed for virus content, bacterial sterility and strain purity. In the same manner a filtrate containing living Type 2 (MEF–1 strain) and a filtrate containing Type 3 (Saukett strain) are prepared.

Four liters of the filtrate containing Type 1 poliomyelitis virus and having an infectivity titer of $10^{-6}$ are cooled to 4° C., and 20 ml. of a ten percent aqueous solution containing 0.115 g./ml. of beta-propiolactone are added with stirring. The resulting solution which contains 0.0005 g./ml. of beta-propiolactone is allowed to stand at this temperature for two hours and is then passed through a centrifugal filmer at the rate of 600 ml. per minute under exposure to ultraviolet irradiation at 25 watts output. The centrifugal filmer apparatus employed, of the type described in United States Patent No. 2,725,482 and produced by the Research Laboratory Division of General Motors Corporation, Detroit, Michigan, comprises a vertically disposed rotatable cylindrical cup chamber, means for rotating the chamber at a normal operating speed of 1700 r.p.m., and a tubular assembly of six uniformly spaced ultraviolet lamps positioned axially within the chamber. The inside diameter of the top rim of the chamber is approximately 9.5 cm. and the inner chamber wall slopes inwardly from the top at an angle of 1° from the vertical. The standing height of the inner chamber wall is approximately 40 cm. The outer surface of the lamp assembly is spaced at a distance of 1 cm. from the inner wall of the chamber and the effective intensity of ultraviolet irradiation at the inner surface of the chamber is approximately 25,000 micro-watts per square centimeter. The average film thickness of the solution exposed to radiation is approximately 75 microns, and the over-all time of exposure is one second. Following this combined exposure, no residual live virus is detectable in the solution by a routine type of monkey kidney tissue titration in which ten duplicate 0.5 ml. samples are seeded and held for seven days. However, trace quantities of live virus may be present; this can be demonstrated by a safety test such as the standard safety test set forth in Minimum Requirements of Poliomyelitis vaccine, published November 11, 1955, by the United States Department of Health, Education and Welfare.

The irradiated solution is then incubated at 37° C. for three hours. Following incubation, the solution is completely free of live poliomyelitis virus as indicated by a negative result in the safety test. The safety test employed was a modification of the standard test just mentioned, in which modification each of ten bottles containing tissue culture nutrient medium is seeded with a 50-ml. aliquot of the vaccine product and held under conditions favorable to virus growth for thirty-two days. The absence of growth of virus indicates that the vaccine is safe.

In the same manner, two further lots of killed poliomyelitis virus vaccine are prepared from different virus strains, one lot from Type 2 (MEF–1) strain and the other from Type 3 (Saukett) strain. In all other respects, the preparation of these two lots of vaccine is identical to the preparation of the above vaccine containing killed Type 1 strain; these vaccines are likewise free of live poliomyelitis virus, as demonstrated by the safety test method mentioned above.

The three vaccines (Types 1, 2 and 3) possess a high order of antigenicity and may be employed suitably either alone or in combination or they may be diluted with sterile saline or sterile Hank's solution, as desired, to provide less concentrated vaccines.

The antigenicity of the vaccine products obtained above can be determined in the following manner. A range of graded half to full-log dilutions of the vaccine are prepared. Young chicks (seven to ten days old) are divided into groups of five to ten in number, each group to receive by individual intramuscular inoculation one of the prepared dilutions. The individual chicks are then inoculated with two 0.5 ml. doses of the vaccine spaced two weeks apart. The chicks are bled one week following the final inoculation and the serum is separated from the blood and individually tested for the presence of specific antibody at a low (1:4) dilution level. In this test a volume of 0.25 ml. of the diluted serum is challenged with an equal volume of tissue culture fluid containing 10 to 1000 fifty percent tissue culture infectious doses ($TCID_{50}$) of the specific type of poliomyelitis virus for which serum antibodies are to be detected. To the mixture of these two volumes in a suitable container is added 0.25 ml. of trypsinized monkey kidney cells in nutrient medium at a concentration of 240,000 cells per ml. The entire mixture is then incubated under conditions favorable for growth of the cells and the virus. In seven days these tissue cultures are read microscopically for the detection of cytopathic degeneration resulting from virus growth. Those cultures which have been protected from the challenge virus by specific serum antibodies exhibit no such degeneration. From the sera showing protection, obtained from the chicks receiving the highest inoculum dilution, the 50% antigen dilution point or "antigen dilution titer" may be determined. This result can be conveniently calculated by the method of Reed and Muench reported in the American Journal of Hygiene, volume 27, pages 493–497 (1938), as set forth in modified form in the standard textbook Viral and Rickettsial Infections of Man, River, 2nd edition, pages 75 and 76, J. B. Lippincott Company. This determination reveals the extent to which the antigen preparation may be diluted to elicit antibody response in 50% of the chicks receiving the inoculum dilution. Since the strength of the challenge dose used in the serum neutralization test can have some influence on the numerical value of the antigen dilution titer, the challenge dose is reported hereinafter to reflect the proper significance of the value for antigen dilution titer.

The results of the determination of the antigenicity of the vaccine products obtained by the above method, as compared with those of the untreated filtrates containing the live virus used as starting material, are given below in Table I.

*Table I*

| Sample tested | Antigen dilution titer | Concentration of challenge dose ($TCID_{50}$) |
|---|---|---|
| Type 1 vaccine obtained by treatment with 0.05% betapropiolactone and ultraviolet light | $10^{-2.08}$ | 204 |
| Untreated filtrate containing live poliomyelitis virus (Type 1) | $10^{-2.33}$ | 204 |
| Type 2 vaccine obtained by treatment with 0.05% betapropiolactone and ultraviolet light | $10^{-2.5}$ | 32 |
| Untreated filtrate containing live poliomyelitis virus (Type 2) | $10^{-3.0}$ | 32 |
| Type 3 vaccine obtained by treatment with 0.05% betapropiolactone and ultraviolet light | $10^{-1.63}$ | 58 |
| Untreated filtrate containing live poliomyelitis virus (Type 3) | $10^{-2.5}$ | 58 |

The antigenicity of the products remains at a high level for long periods of time. This is shown in the case of the above-mentioned vaccines (Types 1, 2 and 3) after storage under refrigeration for six months. At the end of the storage period the products were each diluted with three volumes of sterile Hank's solution, the three resulting solutions were pooled and the antigenicity of the pooled product was determined. This was accomplished not only by means of the above-mentioned chick test which shows the antigen dilution titer but also by a standard test employing monkeys as test animals instead of chicks, the detals of which are set forth in Amendment Number 2 to the Minimum Requirements of Poliomyelitis Vaccine, published May 20, 1954, by the United States Department of Health, Education and Welfare. Briefly, this test is carried out in the following manner; Rhesus monkeys are inoculated with three 1-ml. doses of the vaccine at weekly intervals, the animals are bled one week after the end of the course of inoculation, a serum is prepared from the collected blood and the number of antibodies in the serum is determined. This determination is made by serially diluting the serum with saline and mixing the diluted aliquots so obtained with a standardized solution containing a known number of infectious units of the given type of poliomyelitis virus. For example, when analyzing for Type 1 potency, one uses a standardized solution containing a known number of infectious units of Type 1 poliomyelitis virus; for analysis of Type 2 or Type 3 potency, one uses a standardized solution of infectious Type 2 or Type 3 virus. The end point of the titration is the dilution at which the serum contains sufficient antibodies to exactly neutralize, that is, combine with and render non-infectious, the known number of infectious units of the virus in the standardized solution. A number of monkeys are used in the analysis of the potency for each type of poliomyelitis virus. Since the geometric mean titer is dependent upon the potency of the standardized solution of the infectious poliomyelitis virus used in the test, it is necessary to specify the number of infectious units of the poliomyelitis virus present in the standardized solution to reflect the proper significance of the geometric mean titer. The method of calculating the geometric mean titer is set forth in detail in Amendment Number 2 to the Minimum Requirements of Poliomyelitis Vaccine, published May 20, 1954, by the United States Department of Health, Education and Welfare.

The monkey potency factor as to each virus type was also determined: this involves a comparison of the geometric mean titer of a monkey serum under test with the geometric mean titer of United States Reference Serum (IIA-1) of the National Institutes of Health. The results of these determinations are set forth in Table II which follows:

*Table II*

| Sample tested | Virus type | Chick test | | Monkey test | | |
|---|---|---|---|---|---|---|
| | | Antigen dilution titer | Concentration of challenge dose ($TCID_{50}$) | Geometric mean titer | Concentration of challenge dose ($TCID_{50}$) | Monkey potency factor [1] |
| Pooled vaccine containing Types 1, 2 and 3 of poliomyelitis virus killed by 0.05% beta-propiolactone and ultraviolet light and held for 6 months. | 1 | $10^{-1.2}$ | 24 | 83 | 53 | 1.1 |
| | 2 | $10^{-1.5}$ | 27 | 63 | 68 | 1.27 |
| | 3 | $10^{-1.4}$ | 22 | 33 | 36 | 0.47 |

[1] For a particular virus type the monkey potency factor is calculated by dividing the geometric mean titer of the monkey serum under test by the geometric mean titer of Reference Serum IIA-1 (National Institutes of Health) with respect to the same virus type. Minimum acceptable monkey factors for the various types of poliomyelitis virus are: Type I, 0.29; Type 2, 0.25 and Type 3, 0.16; further details are given in Minimum Requirements of Poliomyelitis Vaccine, published November 11, 1955, by the United States Department of Health, Education and Welfare.

It will be noted from the above table that after six months' storage the vaccine did not appreciably deteriorate with respect to antigenicity or potency. It should be mentioned that the comparable antigen dilution titers of the vaccines of Tables I and II are different but that this is largely due to the fact that the vaccine of Table II has been subjected to a twelve-fold dilution. It is significant that the potency of the vaccine after prolonged storage exceeds minimum government standards for each virus type, by a considerable margin. Although the reasons for the unusual keeping qualities of the vaccine products of the invention are not known, it is believed that this is due at least in part to the fact that the chemical inactivating agent, beta-propiolactone as distinguished from other chemical agents such as formaldehyde, quickly is degraded without special precaution into innocuous by-products which are compatible with, and do not adversely affect, the antigen factors of the vaccine.

EXAMPE 2

An aqueous medium containing live Type 1 (Mahoney) poliomyelitis virus (infectivity titer $10^{-6}$) prepared as described in Example 1 is filtered through an ultra-fine sintered glass filter. To four liters of the filtrate are added 20 ml. of a ten percent aqueous solution containing 0.115 gram per milliliter of beta-propiolactone. The resulting mixture which contains 0.0005 gram per milliliter of beta-propiolactone is heated for two hours at 37° C. and the resulting suspension, having an infectivity titer of less than $10^{-0.1}$, is then passed through a centrifugal filmer at the rate of 600 ml. per minute under exposure to ultraviolet irradiation at 25 watts output using the apparatus and method described in Example 1. The film thickness during exposure is approximately 50 microns and the exposure time slightly less than one second. The resulting virus solution is again filtered through an ultra-fine sintered glass filter and a sample subjected to a safety test as described in Example 1. At this point the vaccine does not contain any live virus as indicated by a negative result in the safety test.

In the same manner two further lots of killed poliomyelitis virus vaccine are prepared from different virus strains, one lot from Type 2 (MEF-1) strain and the other from Type 3 (Saukett) strain. In all other respects, preparation of the above two lots of vaccine is identical to the preparation of the above vaccine containing killed Type 1 strain; these vaccines are likewise free of live poliomyelitis virus.

The three resulting vaccines (Types 1, 2 and 3) possess a high order of antigenicity and may be employed suitably either alone or in combination or they may be diluted with sterile saline or sterile Hank's solution, as desired, to provide less concentrated vaccines.

The antigenicity of the three lots of virus solutions is determined in terms of antigen dilution titer, geometric mean titer and monkey potency factor in accordance with the methods set forth in Example 1. The results of the antigenicity determination so obtained, as compared with comparable results of untreated filtrates containing the live virus used as starting material, are given below in Table III.

*Table III*

| Sample treated | Chick test | | Monkey test | | |
|---|---|---|---|---|---|
| | Antigen dilution titer | Concentration of challenge dose ($TCID_{50}$) | Geometric mean titer | Concentration of challenge dose ($TCID_{50}$) | Monkey potency factor |
| Type I vaccine obtained by treatment with 0.05% beta-propiolactone and ultraviolet light | $10^{-2.0}$ | 204 | 525 | 43 | 13.8 |
| Untreated filtrate containing live poliomyelitis virus (Type I) | $10^{-2.33}$ | 204 | | | |
| Type II vaccine obtained by treatment with 0.05% beta-propiolactone and ultraviolet light | $10^{-2.8}$ | 32 | 141 | 32 | 1.18 |
| Untreated filtrate containing live poliomyelitis virus (Type II) | $10^{-3.0}$ | 32 | | | |
| Type III vaccine obtained by treatment with 0.05% beta-propiolactone and ultraviolet light | $10^{-1.67}$ | 58 | 100 | 58 | 1.45 |
| Untreated filtrate containing live poliomyelitis virus (Type III) | $10^{-2.5}$ | 58 | | | |

It is seen from Table III that the antigenicity of the three types of vaccines of the invention is substantially as great as that of untreated controls, being well above minimum Government standards in this respect as regards monkey potency factor.

The antigenicity of the products after six months storage was also determined. At the end of the storage period the products were each diluted with 3 volumes of sterile Hank's solution, the resulting solutions were pooled and the antigenicity of the pooled product was determined. The result of this determination is set forth in Table IV which follows.

*Table IV*

| Sample tested | Chick test | | | Monkey test | | |
|---|---|---|---|---|---|---|
| | Virus type | Antigen dilution titer | Concentration of challenge dose (TCID$_{50}$) | Geometric mean titer | Concentration of challenge dose (TCID$_{50}$) | Monkey potency factor |
| Pooled vaccine containing Types 1, 2, and 3 of poliomyelitis virus killed by 0.05% beta-propiolactone and ultra-violet light and held for 6 months. | 1 | $10^{-1.37}$ | 24 | 26 | 53 | 0.35 |
| | 2 | $10^{-1.10}$ | 27 | 42 | 68 | 0.82 |
| | 3 | $10^{-1.31}$ | 22 | 18 | 36 | 0.26 |

Table IV illustrates further the stability of the vaccines of the invention after prolonged storage and twelvefold dilution. It also illustrates that satisfactory results are obtainable even though the order of inactivatnig steps be varied.

EXAMPLE 3

An aqueous medium containing live Type 1 (Mahoney) poliomyelitis virus (infectivity titer $10^{-6}$) prepared as described in Example 1 is filtered through an ultra-fine sintered glass filter and the filtrate cooled to a temperature of 4° C. To four liters of the cooled filtrate are added with stirring 40 ml. of a 10% aqueous solution containing 0.115 gram per milliliter of beta-propiolactone and the resulting mixture which contains 0.001 gram per milliliter of beta-propiolactone is held for two hours at the same temperature. The mixture is then passed through a centrifugal filmer at the rate of 600 ml. per minute under exposure to ultraviolet irradiation at 25 watts output employing the apparatus, and in accordance with the method, described in Example 1. The film thickness during exposure is approximately 50 microns and the exposure time is slightly less than one second. The effluent is then collected, heated to 37° C. and held at this temperature for three hours. The resulting virus solution is diluted with three volumes of Hank's solution and mixed to provide an aqueous medium which contains killed poliomyelitis virus as indicated by a negative result in the safety test.

The resulting medium possesses a high order of antigenicity and may be employed suitably as a vaccine. The antigenicity of the virus medium is determined in terms of antigen dilution titer, geometric mean titer and monkey potency factor. The results of the antigenicity determination so obtained, as compared with camparable results for untreated starting material, are given below in Table V.

*Table V*

| Sample tested | Chick test | | Monkey test | | |
|---|---|---|---|---|---|
| | Antigen dilution titer | Concentration of challenge dose ($TCID_{50}$) | Geometric mean titer | Concentration of challenge dose ($TCID_{50}$) | Monkey potency factor |
| Type 1 vaccine obtained by treatment with 0.1% beta-propiolactone and ultra-violet light | $10^{-1.5}$ | 204 | 218 | 53 | 5.8 |
| Untreated filtrate containing live poliomyelitis virus (Type 1) | $10^{-2.33}$ | 204 | ------ | ------ | ------ |

The data of Table V illustrate that the use of a relatively higher proportion of beta-propiolactone provides a vaccine, in accordance with the invention, which greatly exceeds the minimum standard for potency factor.

EXAMPLE 4

An aqueous medium containing live Type 1 (Mahoney) poliomyelitis virus (infectivity titer $10^{-6}$) prepared as described in Example 1 is filtered through an ultra-fine sintered glass filter. To four liters of the filtrate are added 40 ml. of a 10% aqueous solution containing 0.115 gram per milliliter of beta-propiolactone. The resulting mixture which contains 0.001 gram per milliliter of beta-propiolactone is heated for two hours at 37° C. and the resulting suspension, having an infectivity titer of less than $10^{-0.1}$, is then passed through a centrifugal filmer at the rate of 600 ml. per minute under exposure to ultraviolet irradiation at 25 watts output employing the apparatus and method described in Example 1. The film thickness during exposure is approximately 50 microns and the exposure time is slightly less than one second. The mixture is again filtered through an ultra-fine sintered glass filter and a sample subjected to the standard safety test. At this point the vaccine does not contain any live virus as indicated by a negative result in the safety test.

In the same manner two further lots of killed poliomyelitis virus vaccine are prepared from different virus strains, one lot from Type 2(MEF–1) strain and the other from Type 3 (Saukett) strain. In all other respects preparation of these two lots of vaccine is identical to the preparation of the above vaccine containing killed Type 1 strain; these vaccines are likewise free from live poliomyelitis virus.

The three resulting vaccines (Types 1, 2 and 3) possess a high order of antigenicity and may be employed suitably either alone or in combination or that may be diluted with sterile saline or sterile Hank's solution, as desired to provide less concentrated vaccine.

The antigenicity of the three vaccines was determined in terms of antigen dilution titer, geometric mean titer and monkey potency factor in accordance with the methods set forth in Example 1. The results of the antigenicity determination so obtained, as compared with comparable results of untreated filtrate containing live virus used as starting material, are given below in Table VI.

*Table VI*

| Sample tested | Chick test | | Monkey test | | |
|---|---|---|---|---|---|
| | Antigen dilution titer | Concentration of challenge dose ($TCID_{50}$) | Geometric mean titer | Concentration of challenge dose ($TCID_{50}$) | Monkey potency factor |
| Type 1 vaccine obtained by treatment with 0.1% beta-propiolactone and ultraviolet light | $10^{-1.5}$ | 204 | 178 | 53 | 4.78 |
| Untreated filtrate containing live ploiomyelitis virus (Type 1) | $10^{-2.33}$ | 204 | ------ | ------ | ------ |
| Type 2 vaccine obtained by treatment with 0.1% beta-propiolactone and ultraviolet light | $10^{-2.08}$ | 32 | 320 | 68 | 2.5 |
| Untreated filtrate containing live poliomyelitis virus (Type 2) | $10^{-3.0}$ | 32 | ------ | ------ | ------ |
| Type 3 vaccine obtained by treatment with 0.1% beta-propiolactone and ultraviolet light | $10^{-1.5}$ | 58 | 110 | 36 | 1.6 |
| Untreated filtrate containing live poliomyelitis virus (Type 3) | $10^{-2.5}$ | 58 | ------ | ------ | ------ |

From Table VI it will be noted that the antigenicity of the individual monovalent vaccines of the invention compares favorably with that of the corresponding untreated controls and is significantly higher than the minimum standard as regards monkey potency factor.

The antigenicity of the vaccine products after six months' storage was also determined. At the end of the storage period the products were each diluted with 3 volumes of sterile Hank's solution, the resulting solutions were pooled and the antigenicity of the pooled product was determined. The result of this determination is set forth in Table VII which follows.

*Table VII*

| Sample tested | Chick test | | | Monkey test | | |
|---|---|---|---|---|---|---|
| | Virus type | Antigen dilution titer | Concentration of challenge dose (TCID$_{50}$) | Geometric mean titer | Concentration of challenge dose (TCID$_{50}$) | Monkey potency factor |
| Pooled Vaccine containing Types 1, 2 and 3 of poliomyelitis virus killed by 0.1% beta-propiolactone and ultraviolet light and held for 6 months. | 1 | 10$^{-1.3}$ | 24 | 60 | 53 | 0.8 |
| | 2 | 10$^{-1.0}$ | 27 | 91 | 68 | 1.76 |
| | 3 | 10$^{-1.5}$ | 22 | 53 | 36 | 0.75 |

The pooled vaccine of Table VII obtained from monovalent vaccines held for six months and constituting a twelve-fold dilution compares favorably with the vaccines of Table VI in respect to titer.

This application is a continuation-in-part of applications Serial Numbers 439,488 and 439,903, filed June 25, 1954, and June 28, 1954, respectively, both now abandoned.

While in the foregoing specification various embodiments of the invention have been set forth in detail it will be realized by those skilled in the art that considerable variation can be made in such detail without departing from the spirit and scope of the invention.

We claim:

1. Process for producing a poliomyelitis virus vaccine which comprises subjecting aqueous fluid containing living poliomyelitis virus to the killing action of ultraviolet irradiation and the killing action of beta-propiolactone such that one of said actions is sufficient to kill a major proportion of the living poliomyelitis virus present in the fluid and the other of said actions is sufficient to kill all of the residual live poliomyelitis virus present in the fluid, neither action to the extent employed being alone capable of completely killing all of said living virus originally present in the fluid.

2. Process in accordance with claim 1 wherein separate fluids each containing one of Types 1, 2 and 3 poliomyelitis virus are treated and the individual vaccines so produced are subsequently mixed thereby producing a trivalent poliomyelitis virus vaccine containing killed Types 1, 2 and 3 poliomyelitis virus.

3. Process for producing vaccines which comprises exposing an aqueous fluid containing living poliomyelitis virus to the killing action of ultraviolet light sufficient to reduce the infactivity titer of said fluid to a low value and to the action of beta-propiolactone in concentration in the range from 0.0002 to 0.0010 gram per milliliter of fluid.

4. Process for producing poliomyelitis virus vaccine which comprises subjecting an aqueous fluid containing living poliomyelitis virus in a thin film to an exposure of about 25,000 micro-watts per square centimeter of light having a major proportion of energy at a wavelength of 2537 angstrom units for about 0.5 to 2 seconds and to action of beta-propiolactone in a concentration in the range from 0.0002 to 0.0010 gram per milliliter of said fluid for a length of time sufficient to completely kill all of the living virus present in said fluid.

5. Process for producing poliomyelitis virus vaccine which comprises the steps of contacting aqueous fluid having a pH between 5 and 9 and containing living poliomyelitis virus with beta-propiolactone in a concentration in the range from 0.0002 to 0.0010 gram per milliliter of said fluid, exposing said fluid in a film to exposure to about 25,000 micro-watts per square centimeter of ultraviolet light for at least 0.5 second and holding said fluid between 20 to 40° C. for a time sufficient to completely kill all of the living virus present in the fluid, said film having a thickness not greater than 100 microns.

References Cited in the file of this patent

UNITED STATES PATENTS 2,399,443    Massucci _____ Apr. 30, 1946

FOREIGN PATENTS 485,066    Canada _____ June 18, 1951

OTHER REFERENCES

Smolens: Proc. Soc. Exper. Biol. and Med., vol. 86, pages 538–539, July 1954.

Taylor: J. of Immun., vol. 78, No. 1, January 1957, pp. 45–55, esp. p. 54.

Milzer: J. of Immun., vol. 50, No. 6, June 1945, pp. 331–339.

Drug Trade News, vol. 31, Oct. 8, 1956, p. 64.

Hartmann et al.: Fed. Proc., vol. 10, March 1951, pp. 220, 221 358, 361.

Hartmann et al.: J.A.M.A., May 18, 1957, pp. 258–260.